Nov. 19, 1968   R. J. CLARK ET AL   3,411,531
REMOTELY CONTROLLABLE VALVES
Filed April 26, 1966   2 Sheets-Sheet 2

United States Patent Office 3,411,531
Patented Nov. 19, 1968

3,411,531
REMOTELY CONTROLLABLE VALVES
Richard J. Clark, Racine, and Howard J. Wirtz, Sturtevant, Wis., assignors to Racine Hydraulics & Machinery, Inc., a corporation of Wisconsin
Filed Apr. 26, 1966, Ser. No. 545,412
7 Claims. (Cl. 137—491)

ABSTRACT OF THE DISCLOSURE

An electrically controlled valve particularly suitable for servo control wherein a valve member is yieldably urged toward a seat by a solenoid mechanism and the degree of solenoid energization determines the force applied against the valve member with the restriction to flow through the seat controlled by the valve member determining a control pressure utilizable in operating a valve to be controlled.

---

This invention relates to remotely controllable valves and, more particularly, to an electrically controlled valve that is particularly suitable for servo control, such as a relief valve.

At the present time, valves such as relief valves are available that can be remotely controlled and are usable as servo operated relief valves, however, these valves have either been hydraulically operated requiring lengths of hydraulic line or have been operated by torque motors which are extremely expensive.

An object of this invention is to provide a new, improved, and inexpensive remotely controllable valve.

Another object of this invention is to provide a valve for servo operation in which the valve is multi-staged to enable electrical control thereof by a simple, inexpensive, relatively small solenoid which can operate within a range of required force which is of a magnitude substantially less than if directly controlling the fluid.

Still another object of the invention is to provide a relief valve as defined in the preceding paragraph in which the setting of the relief valve can simply be adjusted by controlling the energization of the solenoid and more particularly either the voltage or the current supplied thereto.

Still another object of the invention is to provide a new and improved pressure control valve in which the pressure required to open the valve can be simply adjusted and remotely controlled by means of a solenoid establishing a control pressure proportional to the required pressure and the control pressure established by the solenoid being variable through the electric power supplied to the solenoid.

Further objects and advantages will become apparent from the following detailed description taken in connection with the accompanying drawings in which:

FIG. 3 is a horizontal section taken generally along the line 3—3 in FIG. 1;

Figure 1:
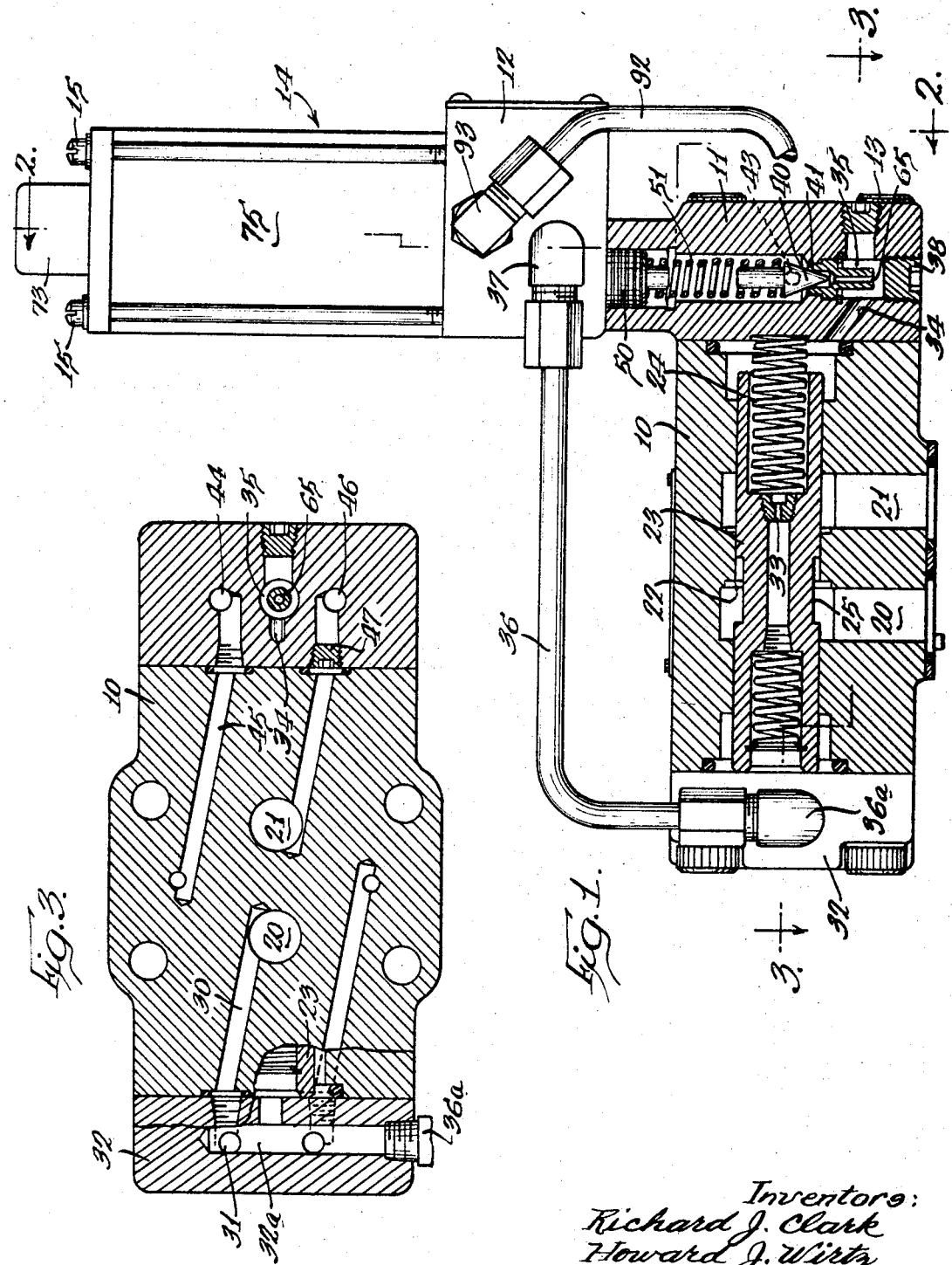
FIG. 1 is a longitudinal vertical section taken centrally of the valve.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Figure 2:
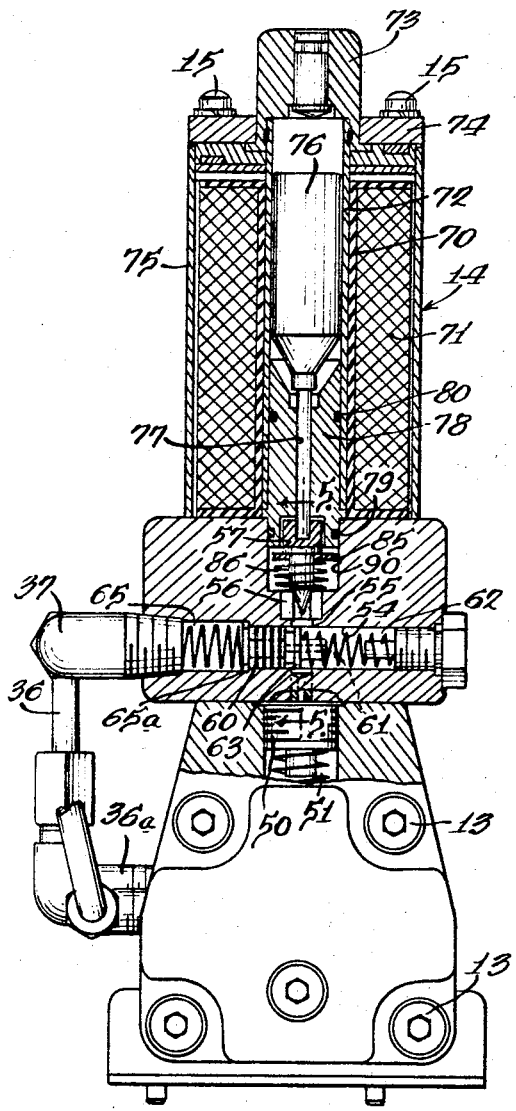
FIG. 2 is a vertical section taken generally along the line 2—2 in FIG. 1.
Figure 4:
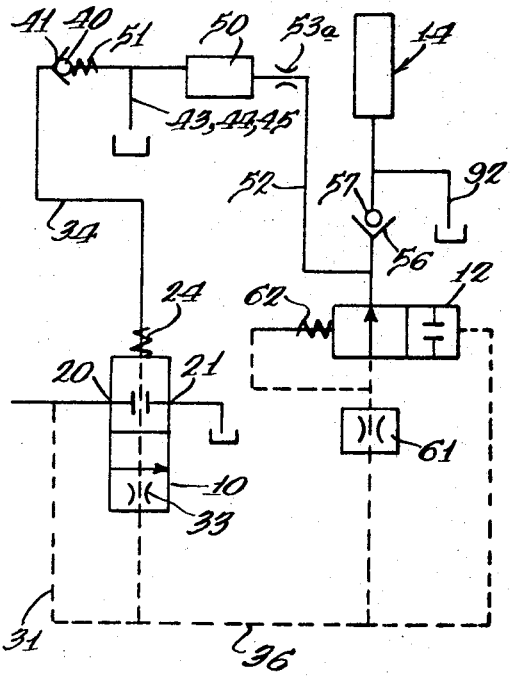
FIG. 4 is a schematic diagram of the circuit of the valve.
Figure 5:
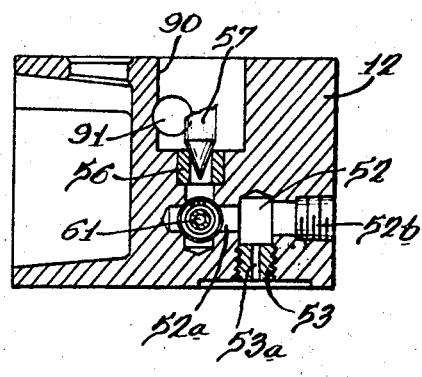
FIG. 5 is a fragmentary vertical section taken generally along the line 5—5 in FIG. 2.

The valve body is made up of three body parts with a primary valve body section 10 connected at one end thereof to a generally upright second stage body section 11 and which has mounted at the top thereof a third stage body section 12. The body sections can be held in assembled relation by suitable bolts with bolts 13 shown in FIGS. 1 and 2 for holding body parts 10 and 11 together. A control solenoid, indicated generally at 14, is mounted to the upper side of the third stage body part 12 by attaching bolts 15.

The primary stage body part 10 has a pressure inlet port 20 and a tank port 21 communicating with a valve bore 22 extending longitudinally of the body part. A hollow valve spool 23 is movably mounted in the bore 22 and is normally urged to the position shown in FIG. 1 by a spring 24 to block communication between the pressure port 20 and the tank port 21. When the valve member 23 shifts to the right as viewed in FIG. 1 against the action of the spring 24, a peripheral groove 25 in the valve member connects the pressure port 20 to the tank port 21.

The valve body part 10 has a lateral passage 30 which connects the port 20 to an upright passage 31 in an end cap 32. Additional passages 32a extending transversely from passage 31 direct pressure fluid to the left-hand end of the valve member 23, as viewed in FIG. 1. Flow through the valve member and through an orifice 33 creates a pressure drop between the left- and right-hand ends of the valve member. The pressure existing at the right-hand end of the valve member is communicated through a passage 34 in the valve body part 11 to a chamber 35. The pressure fluid at port 20 is also directed through the passages 30, 31 and 32a to a fitting 36a and a passage in the form of an external pipe 36 which connects at a fitting 37 to the valve body part 12.

The chamber 35 in valve body part 11 is capped at one end by a threaded cap 38 and has a poppet valve member 40 coacting with a valve seat 41 whereby fluid entering the valve body part 11 through the passage 34 is blocked when the valve member 40 is closed against its seat. When the valve member 40 opens as more fully explained hereinafter, flow past the valve seat 41 passes to tank through a passage 43 above the seat which extends transversely of the body part to connect with a passage 44 communicating with an external drain passage 45 in the body part 10. An alternate upright passage 46 is blocked by plug 47.

The poppet valve member 40 is urged against the valve seat 41 by a movable ram 50 disposed adjacent the upper end of the chamber 35 and connected to the valve member by a spring 51. Although a spring is disclosed as forming the connecting member, this could also be a rigid member, since it is the ram 50 which controls the positioning of the valve member 40. The upper side of the ram 50 communicates with a chamber 52, formed in the body section 12, having at its lower end an insert 53 with an orifice passage 53a which functions as a stabilizing orifice. The chamber 52 through a transverse passage 52a, capped at one end by cap 52b, communicates with a valve bore 54 and a passage 55 having a valve seat 56 with an associated poppet valve member 57.

The valve bore 54 houses a pressure-compensated flow control valve mechanism, including a valve spool 60 having an orifice passage 61 and a spring 62 urging the valve member toward the left. The valve member has a land 63 to modulate fluid flow from the right-hand end of the valve bore 54, as viewed in FIG. 2, to the passage 55. The valve member 60 is limited in movement in one direction by a spring 65 and washer with screen filter 65a.

The operation of the flow control is the same as that of valve 12 in Patent No. 3,146,790. The orifice 61 at less than maximum flow causes a slight pressure drop less than the value of the spring 62 whereby the flow is not limited. With maximum flow, the pressure drop through the orifice 61 is greater and the land 63 modulates the flow.

The solenoid 14 has a bobbin 70 on which a coil 71 is wound. A liner 72 is positioned within the bobbin and closed by a cap 73 which has its internal surface brazed to the liner 72. An end plate 74 is held to an outer casing 75 for the solenoid which encloses the coil 71 by the bolts 15. A flanged armature 76 is movable within the liner and the lower end thereof engages a pin 77 extending through an opening in a guide member 78 sealed to the body section 12 and solenoid liner 72 by O-rings 79 and 80, respectively. The pin 77, at its lower end, fits within a recess in the poppet valve member 57 and forms a loose connection between the armature and the valve member. There is no seal between the valve member 57 and the armature 76, which results in a "wet" armature and avoids hysteresis which would otherwise be induced by the friction of seals used to keep the armature dry.

The energization of the coil 71 can be provided through either voltage or current control and can be varied to establish a level of force applied to the valve member 57 through the armature 76 and pin 77 and which results in setting a predetermined control pressure. A thermistor (not shown) can be included in the circuit to provide temperature stabilization. So long as there is fluid flow through the pressure compensated flow control, there will be a predetermined control pressure, dependent upon the degree of energization of the coil 71 and this control pressure will, through the passages leading to the upper side of the ram 50, exert a force on the ram. This force on the ram is exerted on the valve member 40 in the valve second stage through the stiff spring 51. The effective area of the ram upper side is a number of times greater than the effective area of valve member 40 exposed to pressure in chamber 35. Therefore, the control pressure established by the solenoid controlled poppet valve member 57 may be a similar number of times less than the over-all system pressure value to be maintained. As an example, the effective area of the ram 50 is ten times the effective area of the valve member 40 and, thus, the control pressure established by the solenoid controlled valve member 57 need only be one-tenth the value of the system pressure to be controlled.

A minimum pressure is established by means of a washer 85 surrounding a reduced stem portion of the poppet valve member 57 and engaging against a shoulder thereof and which is urged upwardly by a spring 86 seated between the washer and the valve seat 56. This spring removes the weight of the parts acting on the valve member 57 from the system.

A chamber 90 in the valve body 12 houses the poppet valve member 57 and this chamber communicates with the drain through a passage 91 including an external line 92 connected to the body part 12 by a fitting 93.

In operation, the desired pressure at which the disclosed relief valve will operate to relieve pressure is established by the current supplied to the solenoid coil 71. With the fluid circuit supplying fluid, there will be a flow through the valve and past the solenoid controlled valve member 57 and with the pressure existing upstream of the latter valve member being a control pressure which is applied to the upper side of the ram 50. During operation, fluid pressure is exerted against the pilot poppet valve member 40 in chamber 35 of valve body part 11 and, so long as this pressure does not exceed the set control pressure times the effective area ratio of the ram 50 and valve member 40, the valve member 40 will remain closed. When this pressure is exceeded, then the valve member 40 opens to discharge fluid to drain through the outlet passage 43. As a specific example, with the area of ram 50 being ten times the effective area of the valve member 40, a control pressure set by the solenoid controlled valve member 57 of 300 p.s.i. will establish a controlled pressure setting of 3,000 p.s.i., so that when this pressure is exceeded in the line the valve member 40 will open to permit shift of the main valve member 23 and connect the inlet port 20 with the outlet port 21 leading to tank.

Although a relief valve system has been disclosed herein, there are many other applications of the remote control servo concept, such as a sequence valve. A primary concept embodied herein is the use of a low-cost, small solenoid establishing a control pressure which can function to control porting of a valve handling much higher pressures and in which the setting of the control pressure can be remotely controlled simply through the degree of energization of the solenoid coil.

We claim:

1. A valve mechanism for controlling the flow of a fluid comprising a first valve member normally positioned to affect communication between a fluid inlet and an outlet connection, a second valve member responsive to pressure in the fluid inlet and which is normally closed but opens when a pressure setting is exceeded to permit fluid flow to tank whereby the first valve member can shift to alter the communication between the fluid inlet and outlet, and means for establishing said pressure setting including a pilot ram operatively connected to said second valve member and having an effective fluid pressure area X times greater than the effective fluid pressure area of said second valve member, and a solenoid controlled valve member for establishing a control fluid pressure which communicates with said ram and is of a value X times less than the desired pressure setting whereby the selected energization of the solenoid to a degree to establish the relatively small control pressure provides for the establishment of a substantially higher pressure setting at which the second valve member will open.

2. A valve mechanism as defined in claim 1 wherein said first valve member when normally positioned blocks communication between the inlet and outlet with said outlet connected to tank and the first valve member shifts to unblock communication when the second valve member opens.

3. An hydraulic valve having a remotely controllable pilot section comprising, a body having a chamber with an outlet having a valve seat and a port for connection to tank, a first valve member positionable relative to said seat to control the fluid flow therethrough from said chamber to said tank, a solenoid operatively associated in coaxial relation with the valve member for urging the valve member toward the seat and variably energizable to control the magnitude of a control pressure existing in said chamber, a pilot ram in fluid communication with said chamber, a second valve member controlled by said ram having an effective pressure area less than that of said ram and subjected to the pressure of fluid that is to be controlled whereby said control pressure can be of a value less than the controlled pressure and the solenoid can be of a commensurately reduced size, and means for limiting the rate of fluid flow past said first valve member.

4. A valve as defined in claim 3 wherein said rate limiting means comprises a pressure compensated flow control valve.

5. A valve as defined in claim 4 wherein said second valve member is in fluid communication with a third valve member for controlling the position thereof.

6. A system for establishing a predetermined control pressure comprising, a valve having a chamber with an outlet having a valve seat, a tapered valve member positionable relative to said seat to control the fluid flow therethrough, a solenoid operatively associated with the valve member for urging the valve member toward the seat and increasing the magnitude of a control pressure existing in said chamber with increased solenoid energization and a pressure compensated flow control valve positioned upstream of said valve seat to limit the rate of fluid flow past said valve member.

7. A system as defined in claim 6 wherein said solenoid has a coil adjacent said valve member and an interior chamber, an armature movable in said chamber and controllable by the coil of said solenoid, means establishing a nonfluid-tight connection between the armature and the valve member to have the armature immersed in fluid with minimal friction restraint whereby hysteresis is substantially avoided with the degree of coil energization determining the fluid pressure established by the valve member.

References Cited

UNITED STATES PATENTS

| | | | |
|---|---|---|---|
| 1,587,921 | 6/1926 | Ray | 251—141 X |
| 2,245,271 | 6/1941 | Guill | 137—498 |
| 2,307,949 | 1/1943 | Phillips | 137—498 |
| 2,588,522 | 3/1952 | Harris | 251—30 X |
| 2,625,136 | 1/1953 | Moog | 251—129 X |
| 2,789,543 | 4/1957 | Popowsky | 251—30 X |
| 2,844,157 | 7/1958 | Griffith | 251—129 X |
| 3,180,355 | 4/1965 | Long | 137—491 |
| 3,250,294 | 5/1966 | Hipple | 251—30 X |

ARNOLD ROSENTHAL, *Primary Examiner.*